July 19, 1949.　　　　F. MARQUES ET AL　　　　2,476,502
ATTACHMENT FOR FENDERS

Filed Jan. 2, 1946

INVENTORS
FRANCISCO MARQUES
SEROP ODABASHIAN
BY
Charles S. Evans
Attorney

Patented July 19, 1949

2,476,502

UNITED STATES PATENT OFFICE 2,476,502

ATTACHMENT FOR FENDERS

Francisco Marques and Serop Odabashian,
San Francisco, Calif.

Application January 2, 1946, Serial No. 638,705

7 Claims. (Cl. 224—42.31)

Our invention relates to a device attachable upon a fender or other portion of a motor vehicle for providing an anchorage to which a rope may be secured for tying articles to the vehicle.

It is among the objects of our invention to provide a fender attachment which may be easily and effectively clamped upon a fender without marring the finish.

Another object is to provide a fender attachment embodying improved features of construction, arrangement and cooperative relationship.

The invention possesses other valuable features, some of which with the foregoing will be set forth at length in the following description where that form of the invention which has been selected for illustration in the drawings accompanying and forming a part of the present specification is explained. In said drawings, one form of the invention is shown, but it is to be understood that it is not limited to that form, since the invention as set forth in the claims may be embodies in a plurality of forms.

In the drawings:

Figure 1 is an isomeric view showing the attachment clamped onto a fender, the fender being shown in section.

Figure 2 is a view of the under side of the attachment, some portions being broken away and shown in section.

In terms of broad inclusion, the device of our invention comprises a body plate having rope engaging means thereon, and provided with clamping arms and actuating levers operable for clamping the plate onto a portion of a motor vehicle such as a fender.

In terms of greater detail, our invention comprises a body plate 1 having a downwardly turned flange 2 upon its rearward edge and downwardly turned bearing lugs 3 in spaced relation to the flange 2. A rope engaging hook 4 is provided upon the plate. Preferably the outer edge of the plate 1 is downwardly and inwardly turned to provide a cowling 6 along the front edge of the body.

A pair of clamping rods 7 are journaled upon the flange 2 and lugs 3. The rods 7 extend under the plate 1 in spaced parallel relation to the plate and to each other. The forwardly extending ends of the rods 7 are shaped to form arched resilient clamping arms 8. Preferably the arms 8 are covered with rubber tubing 9 or other suitable padding material for preventing injury to surfaces against which the arms may be clamped.

At the rearward edge, the rods 7 are bent to provide levers 11 by which the arms 8 may be turned to clamping and unclamping positions. The levers are arranged to lie in substantially parallel relation along the back of the flange 2 when the arms 8 are in clamping position; and to swing upwardly as indicated in dotted lines in Figure 1, to move the arms to unclamping position. Detents 12 are provided for engaging openings 13 in the flange 2 to hold the levers 11 and arms 8 in clamping position. The resilience of the rod material 7 permits the levers to be sprung rearwardly to allow the detents to engage and disengage the openings 13. A grip 14 may be provided on each lever 11 if desired.

Pads 16 are provided upon the under side of the plate 1 to bear against the surface of a fender 15 onto which the attachment is clamped. In the illustrated embodiment the pads 16 comprise sections of rubber tubing applied over fingers 17 positioned in spaced parallel relation to the under side of the plate. The fingers 17 may be formed from extensions inwardly turned from the lower edges of the flange 2, and curled to substantially tube-like shape. Preferably the fingers are aligned with the lugs 3, which provide seats for the free ends of the fingers.

In operation, the arms 8 are swung to a position in a plane substantially normal to the plate 1 to provide a maximum clearance under the pads 16. The plate is then moved to a desired position on a fender or other support, with the fender extending between the pads 16 and the arms 8. The levers 11 are then swung downwardly to lie against the back of the flange 2 as shown in Figure 1. This movement of the levers 11 swings the arms 8 outwardly and upwardly against the under side of the fender. The arched resilient arms 8 yield sufficiently to accommodate the fender, and to apply a firm pressure thereon for clamping the fender between the arms 8 and pads 16. The hooks 4 may then be used as an anchorage for ropes applied to tie luggage or other articles onto the vehicle.

We claim:

1. An attachment for motor vehicle fenders comprising a body plate provided with rope engaging means, a clamping arm pivoted upon the under side of the body plate, and an actuating lever connected to the arm for moving the same between fender engaging and disengaging positions.

2. An attachment for motor vehicle fenders comprising a body plate provided with rope engaging means, cushion means upon the under side of the plate, a clamping arm pivoted upon the under side of the body, and a lever connected to the arm for actuating the arm to clamp a fender between the arm and the cushion means.

3. An attachment for motor vehicle fenders comprising a body plate provided with rope engaging means, cushion means upon the under side of the plate, a pair of resilient clamping arms pivoted upon the under side of the body, and a lever connected to each arm for actuating the arms to clamp a fender between the arms and the cushion means.

4. An attachment for motor vehicle fenders comprising a body plate provided with rope engaging means, cushion means upon the under side of the plate, a pair of resilient clamping arms pivoted upon the under side of the body, and a lever connected to each arm for actuating the arms to clamp a fender between the arms and the cushion means, the levers being disposed in substantially parallel relation along an edge of the plate when the arms are in fender engaging position.

5. An attachment for motor vehicle fenders comprising a body plate having a downwardly turned flange upon one edge and bearing lugs spaced from the flange, cushion means underlying the plate, a pair of clamping arms journaled upon the flange and lugs and movable to clamp the plate upon a fender, and actuating levers connected to the arms.

6. An attachment for motor vehicle fenders comprising a plate having a downwardly turned flange upon an edge and downwardly turned bearing lugs spaced from the flange, fingers carried by the flange and extending under the plate in spaced relation thereto, pads upon the fingers, clamping arms journaled upon the flange and lugs adjacent the fingers, levers connected to the arms for moving the same into engagement with the under side of a fender for clamping the fender between the arms and the fingers, and rope engaging means upon the plate.

7. An attachment for motor vehicle fenders comprising a plate having a downwardly turned flange upon an edge and downwardly turned bearing lugs spaced from the flange, fingers carried by the flange and extending under the plate in spaced relation thereto, pads upon the fingers, resilient arched clamping arms provided with pads and journaled upon the flange and lugs adjacent the fingers, levers connected to the arms for moving the same into engagement with the under side of a fender for clamping the fender between the arms and the fingers, and rope engaging means upon the plate.

FRANCISCO MARQUES.
SEROP ODABASHIAN.

REFERENCES CITED

The following references are of record in the file of this patent:

UNITED STATES PATENTS

| Number | Name | Date |
| --- | --- | --- |
| 1,708,433 | Stinson | Apr. 9, 1929 |
| 1,827,498 | Weeks | Oct. 13, 1931 |